W. H. RICKARD AND L. G. WALKER.
TIRE CARRIER AND LOCK.
APPLICATION FILED MAR. 19, 1921.

1,407,580.

Patented Feb. 21, 1922.
3 SHEETS—SHEET 1.

Inventor
William H. Rickard
and Luther G. Walker
By Lloyd W. Patch
their Attorney

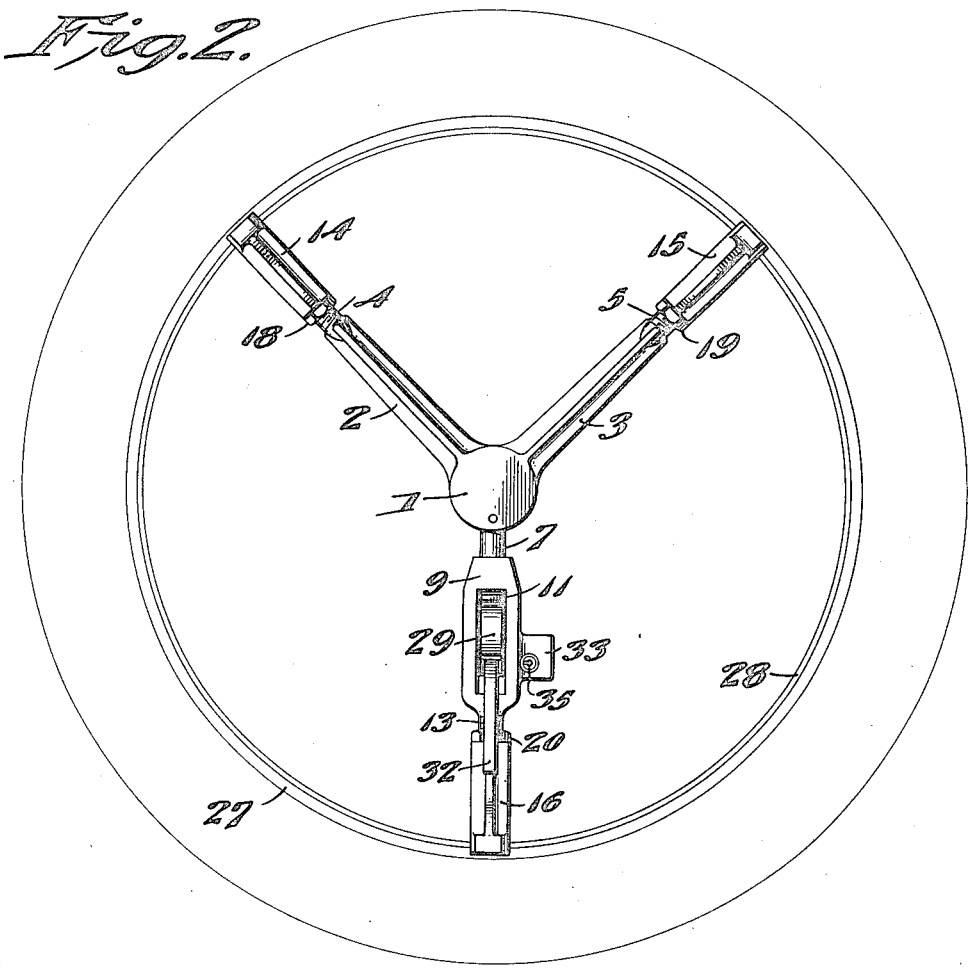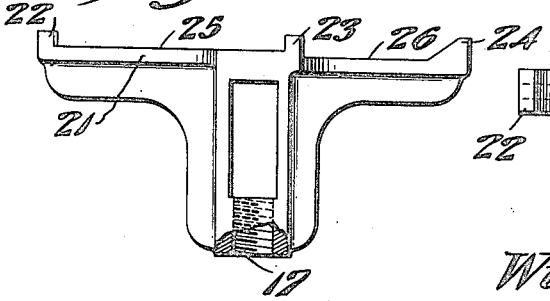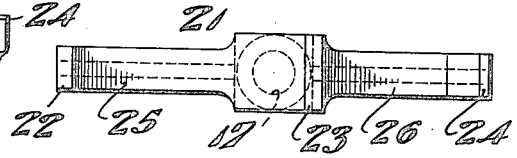

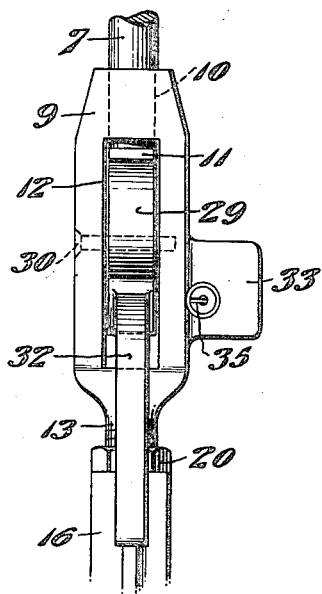
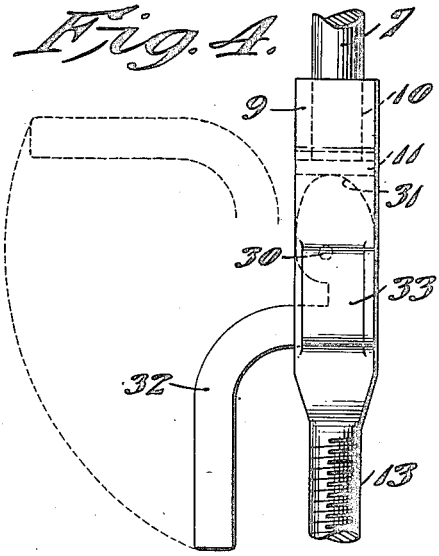
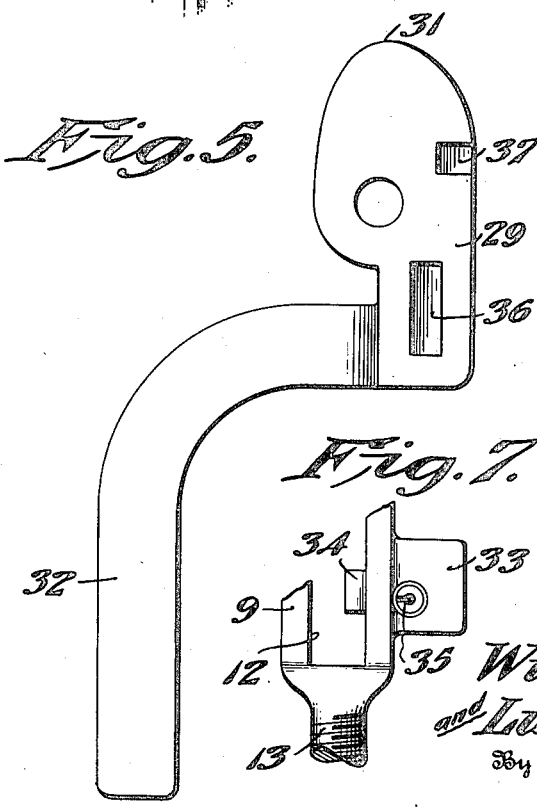
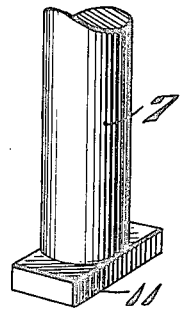
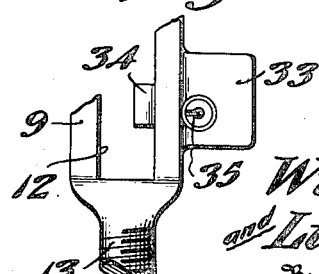

UNITED STATES PATENT OFFICE.

WILLIAM H. RICKARD AND LUTHER G. WALKER, OF PUEBLO, COLORADO.

TIRE CARRIER AND LOCK.

1,407,580.  Specification of Letters Patent.  Patented Feb. 21, 1922.

Application filed March 19, 1921. Serial No. 453,645.

*To all whom it may concern:*

Be it known that we, WILLIAM H. RICKARD and LUTHER G. WALKER, residents of Pueblo, in the county of Pueblo and State of Colorado, (and whose post-office address is "care The Pueblo Automobile Company, corner Fifth and Court Streets, Pueblo, Colorado,") citizens of the United States, have invented certain new and useful Improvements in a Tire Carrier and Lock, of which the following is a specification.

This invention pertains to a tire carrier and lock, and particularly to means for locking spare tires upon tire carrying devices installed upon automobiles, and also adapted to be carried upon a hub mounted on an automobile.

An object is to provide a spare tire carrier and lock which is of simple and durable construction and is adapted to practically all designs and makes of automobiles and to various forms of tire rims and carrier rings.

A further object lies in so constructing the parts that provision is made for adjustment to suit various conditions of use and different forms of installation.

A still further object resides in providing a lock structure by which one or more tires can be securely and permanently locked in position to thus prevent loss upon the road or by theft, and in so constructing the lock features that as nearly burglar proof conditions as possible are accomplished, while the lock may be readily opened and the tire released by the use of a proper key.

With these and other objects, which will be apparent from the drawings, specification and claims, this invention includes certain novel features of construction and combinations of parts which will now be set forth.

In the drawings:

Fig. 2 is a view in elevation of the parts as they appear in the locked position.

Fig. 3 is a detail front elevation of the tightening and locking features.

Fig. 4 is a view at right angles to Fig. 3.

Fig. 5 is an elevation of the tightening cam.

Fig. 6 is a perspective of the head end of the tightening or pressure rod.

Fig. 7 is a broken detail view to show the lock bolt.

Fig. 10 is a view in elevation of one of the tire carrying shoes.

Fig. 11 is a top plan of the shoe.

Figure 1:
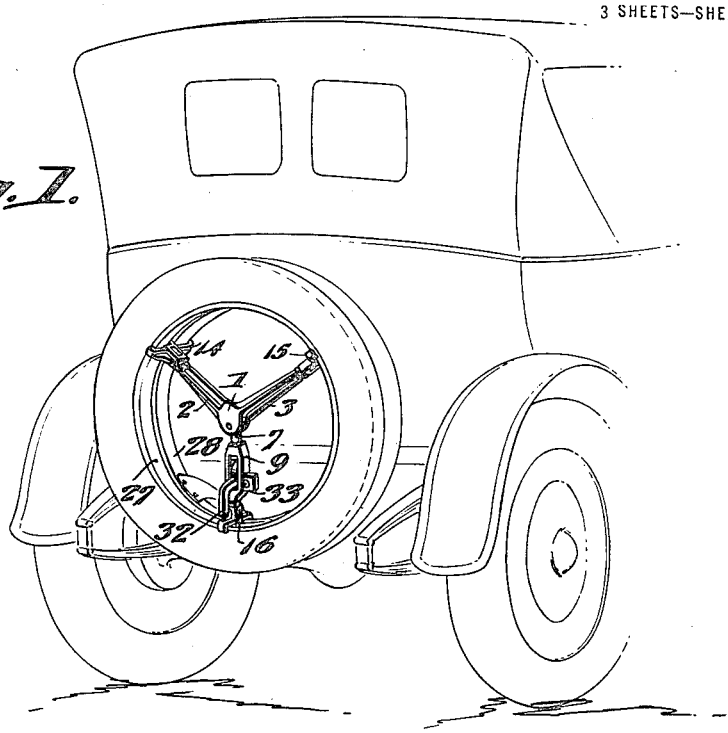
Figure 1 is a view in perspective of the rear of an automobile showing our improved structure applied in use.
Figure 8:
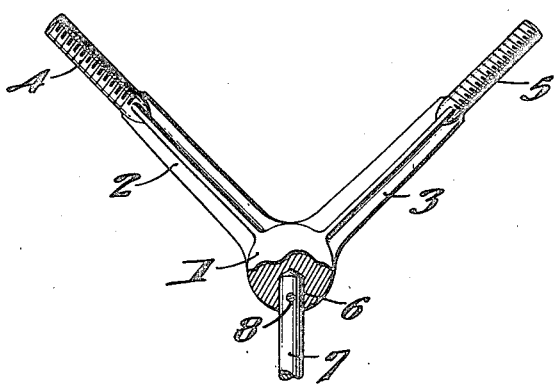
Fig. 8 is a detail of the spreader arms.

A hub 1 has spreader arms 2 and 3 extending radially therefrom and provided with the screw threaded ends 4 and 5, and this hub has an opening 6 in which a pressure rod 7 is fitted to be held in place by a pin 8. By this arrangement the arms 2 and 3 and the pressure rod 7 form the main support of a spreader structure.

A yoke 9 has an opening 10 through which the pressure rod is slidably fitted, a rectangular head 11 on the pressure rod working within a slot 12 in the yoke to hold the same against turning upon the rod. This yoke has a threaded extension 13 at its outer end corresponding substantially to the threaded ends 4 and 5 of arms 2 and 3.

Tire carrying shoes 14, 15 and 16, constructed substantially as shown in Figs. 10 and 11, are provided with the threaded openings 17 to receive the threaded ends 4, 5 and 13, and lock nuts 18, 19 and 20 are provided to hold adjustments of the shoes. These tire carrying shoes are provided with the crossheads 21 having transverse flanges 22, 23 and 24 on their outer faces. These outer faces are formed on two levels as at 25 and 26, the former adapted to receive a tire rim 27 and the latter reduced sufficiently to accommodate a carrier ring 28.

Within the slot 12 of yoke 9 a cam 29 is pivoted on a pin 30, the enlarged portion 31 of the cam being disposed to bear against the rectangular head 11 of rod 7 when the cam lever 32 is pressed down to the full line position in Fig. 4, and to relieve this pressure when the lever is moved to the dotted line position.

The cam 29 is provided to lengthen the spreader arm including pressure rod 7 and expand the shoes 14, 15 and 16 into the proper clamping engagement against a rim 27 or ring 28, or both, and to insure against loss or theft through loosening of the parts a lock structure is provided to hold the cam in its clamping position. This lock structure is embraced in a lock case 33 cast or otherwise formed on the side of yoke 9 and preferably of substantial construction so that the lock structure cannot be tampered with or readily broken. A spring pressed locking bolt 34 is provided to extend into the slot 12 of yoke 9 and is withdrawn against the pressure of the spring by the use of a key inserted through key slot 35. The cam 29 has a lock bolt recess 36 in which bolt 34 is received to hold the cam in the clamping position, and to retain the cam in the inoperative position a recess 37 is provided into which the bolt springs when the cam lever is moved to the dotted line position in Fig. 4.

In use, the shoes are adjusted upon the threaded ends to accommodate the diameter of the tire rim or carrier ring and are set by the lock nuts so that the heads thereof extend parallel with the axis of hub 1. The device is then fitted within the rim or ring and cam lever 32 is depressed to extend pressure rod 7 from yoke 9, thus causing the shoes to be expanded to a clamping relation. Bolt 34 is withdrawn from recess 37 by the use of a key previous to movement of the cam, and as the lever is swung down and recess 36 comes into registry with the lock bolt this bolt will spring back into the recess and the cam is locked until the lock bolt is again withdrawn by the use of the key.

Figure 9:
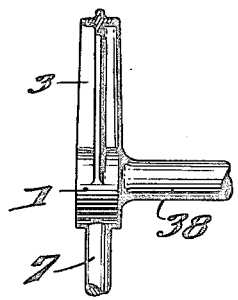
Fig. 9 is a showing of a detail in which the spreader arms are carried on a hub to be mounted on an automobile.

The device adapts itself particularly for use with a tire carrier ring, to hold one or two tires, and in this relation is supported by the carrier ring 28, the latter being in turn mounted by brackets or in other suitable manner upon an automobile. However, the hub 1 may have a spindle 38 extending from the inner side thereof to form a mounting, as shown in Fig. 9, by which the device is secured upon an automobile and in this construction the tires will be supported and held entirely by the carrier, and will be secured and retained against loss or theft by the lock.

While, in the foregoing, we have described specific embodiments, and have mentioned only certain possible modification, it will be appreciated that in practice we do not limit ourselves to such specific details as herein set forth, but may resort to any practical modifications falling within the scope of the invention as defined in the appended claims.

We claim:

1. A tire carrier including a hub having a pair of arms branched radially therefrom, a pressure rod also extending radially from the hub and provided with a head, a yoke mounted slidably on the pressure rod, tire rim engaging shoes mounted on said arms and on the outer end of the yoke, and a cam carried by the yoke to engage with the head of the pressure rod and expand the structure to clamp the shoes in engagement with a tire rim.

2. A tire carrier and lock including a hub having a pair of arms branched radially therefrom, a pressure rod also extending radially from the hub and provided with a head, a yoke mounted slidably on the pressure rod, tire rim engaging shoes mounted on said arms and on the outer end of the yoke, a cam carried by the yoke to engage with the head of the pressure rod and expand the structure to clamp the shoes in engagement with a tire rim, and a key released lock to hold the cam in the operative position.

3. A tire carrier including with a hub, a pair of spreader arms extending radially from the hub and threaded at their outer ends, a pressure rod extending radially from the hub and provided with a rectangular head, a yoke slidably mounted on the pressure rod and held against turning by the rectangular head, a threaded extension at the outer end of the yoke, tire rim receiving shoes mounted on the threaded ends of the spreader arms and the yoke, and a cam mounted within the yoke to engage with the head of the pressure rod to expand the structure and clamp the shoes against a tire rim.

4. A tire carrier including with a hub, a pair of spreader arms extending radially from the hub and threaded at their outer ends, a pressure rod extending radially from the hub and provided with a rectangular head, a yoke slidably mounted on the pressure rod and held against turning by the rectangular head, a threaded extension at the outer end of the yoke, shoes provided with threaded orifices mounted adjustably on the threaded ends of the spreader arms and the yoke and provided with flanged heads to receive a tire rim, lock nuts by which adjustments of the shoes are held, and a cam provided with an operating lever pivoted within the yoke to be moved to bear against the head of the pressure rod and expand the structure to bring the shoes into clamping engagement with a tire rim.

5. A tire carrier and lock including with a hub, a pair of spreader arms extending radially from the hub and threaded at their outer ends, a pressure rod extending radially from the hub and provided with a rectangular head, a yoke slidably mounted on the pressure rod and held against turning by the rectangular head, a threaded extension at the outer end of the yoke, tire rim receiving shoes mounted on the threaded ends of the spreader arms and the yoke, a cam mounted within the yoke to engage with the head of the pressure rod to expand the structure and clamp the shoes against a tire rim, and a key released lock to hold the cam in the operative position.

6. A tire carrier and lock including with a hub, a pair of spreader arms extending radially from the hub and threaded at their outer ends, a pressure rod extending radially from the hub and provided with a rectangular head, a yoke slidably mounted on the pressure rod and held against turning by the rectangular head, a threaded extension at the outer end of the yoke, shoes provided with threaded orifices mounted adjustably on the threaded ends of the spreader arms and the yoke and provided with flanged heads to receive a tire rim, lock nuts by which adjustments of the shoes are held, a cam provided with an operating lever pivoted within the yoke to be moved to bear against the head of the pressure rod and expand the structure to bring the shoes into clamping engagement with a tire rim, said cam having two lock bolt recesses therein, and a key released lock structure carried by the yoke with the bolt thereof engaging in the recesses of the cam to hold the cam in operative and inoperative positions.

In testimony whereof we hereunto affix our signatures.

WILLIAM H. RICKARD.
LUTHER G. WALKER.